United States Patent [19]

Di Fusco et al.

[11] Patent Number: 5,367,948
[45] Date of Patent: Nov. 29, 1994

[54] QUANTITY MEASURING COFFEE MACHINE

[75] Inventors: Judith Di Fusco, 32 Beach Ave., Port Jefferson Station, N.Y. 11776; Richard L. Miller, Dix Hills, N.Y.

[73] Assignee: Judith Di Fusco, Port Jefferson Station, N.Y.

[21] Appl. No.: 209,465

[22] Filed: Mar. 14, 1994

[51] Int. Cl.⁵ .............................................. A47J 31/40
[52] U.S. Cl. .................... 99/289 R; 222/430; 222/450; 99/285
[58] Field of Search ............. 99/279, 285, 286, 289 R, 99/289 T, 289 D, 289 P, 295, 300; 222/426, 430, 450

[56] References Cited

U.S. PATENT DOCUMENTS

| | | | |
|---|---|---|---|
| 3,327,615 | 6/1967 | Swan | 99/289 |
| 4,380,309 | 4/1983 | Takahashi | 222/450 |
| 4,421,014 | 12/1983 | Vicker | 99/289 P |
| 4,545,296 | 10/1985 | Ben-Shmuel | 99/289 P |
| 4,602,558 | 7/1986 | Kaper | 99/289 R |
| 4,674,660 | 6/1987 | Botto | 222/181 |
| 4,893,737 | 1/1990 | Borjesson | 222/360 |
| 4,998,648 | 3/1991 | Contreras | 222/370 |

*Primary Examiner*—Robert W. Jenkins
*Attorney, Agent, or Firm*—Richard L. Miller

[57] ABSTRACT

A coffee machine, for measuring and dispensing a desired quantity of coffee material, comprising a coffee bin, for holding coffee material, the coffee bin having a bin nozzle. A measuring disk is mounted below the bin nozzle, the measuring disk having a plurality of measuring cavities—each measuring cavity corresponding to a quantity of coffee material. A selector knob allows a user to align a specific measuring cavity directly below the bin nozzle. An upper solenoid selectively allows and prevents the flow of coffee material from the bin nozzle to the measuring cavity directly below the bin nozzle. A lower solenoid selectively allows the flow of coffee material from the measuring cavity directly below the bin nozzle, and prevents coffee material flow from that measuring cavity to allow it to fill with coffee material.

6 Claims, 1 Drawing Sheet

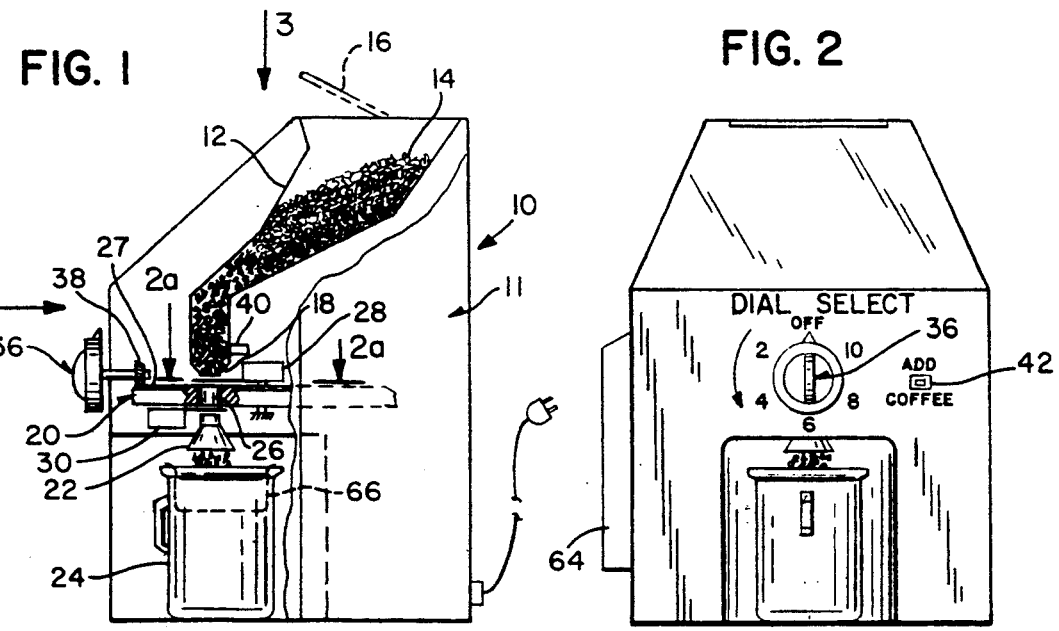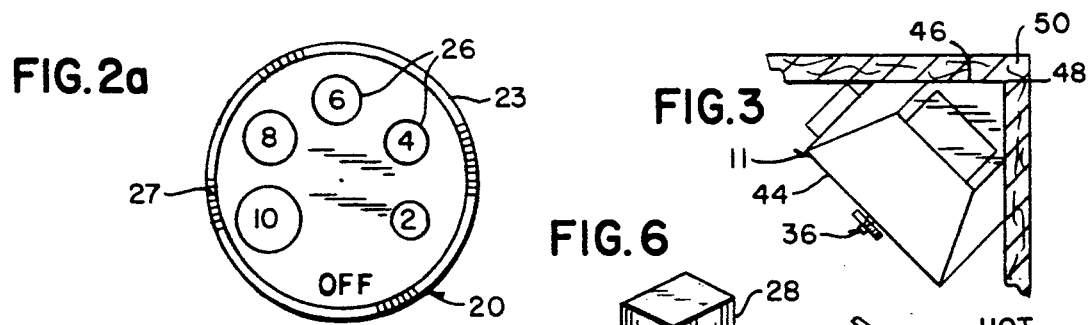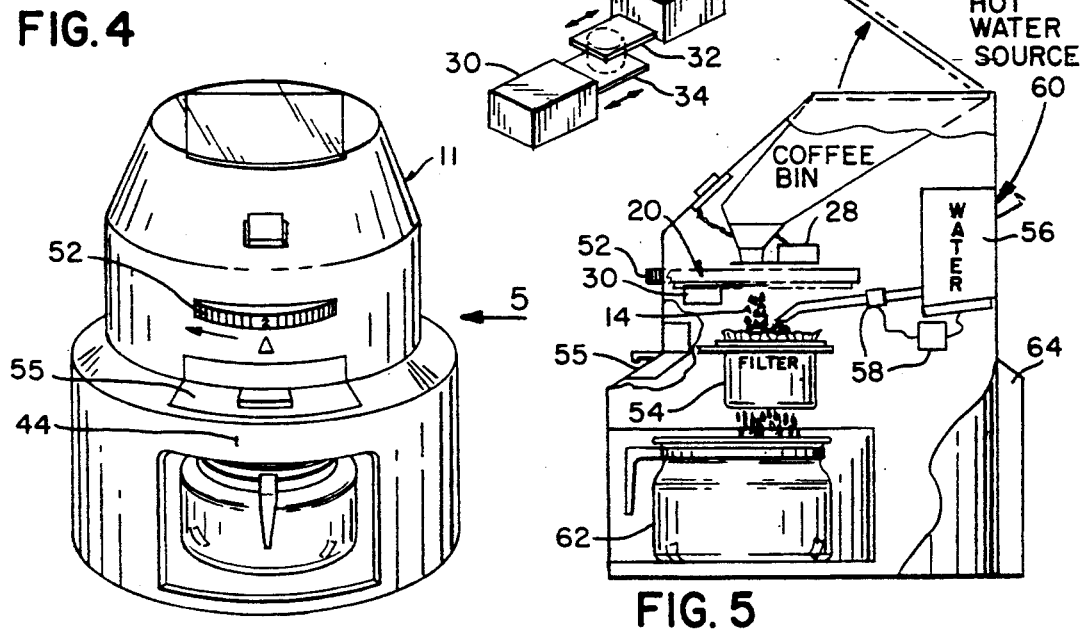

QUANTITY MEASURING COFFEE MACHINE

BACKGROUND OF THE INVENTION

The invention relates to a quantity measuring coffee machine. More particularly, the invention relates to a coffee machine that allows a user to select and measure a desired quantity of coffee.

Conventional coffee machines make a fixed quantity of coffee. Coffee is wasted when more coffee must be prepared than is desired or necessary.

Most people will finish the coffee in a pot prior to making a fresh pot. Therefore, the first person has the luxury of having fresh coffee, while the latecomers are forced to drink "old" coffee.

U.S. Pat. No. 4,674,660 to Botto, discloses a measuring and dispensing canister having a plurality of measuring tubes.

U.S. Pat. No. 4,893,737 to Borjesson, discloses a dispensing apparatus for dispensing goods such as coffee.

U.S. Pat. No. 4,998,648 to Contreras, discloses a coffee dispenser, for dispensing a predetermined amount of coffee.

While these units may be suitable for the particular purposes employed, or for general use, they would not be as suitable for the purposes of the present invention as hereinafter disclosed.

SUMMARY OF TEE INVENTION

It is an object of the invention to provide a quantity measuring coffee machine that allows a desired quantity of coffee to be measured and dispensed.

It is another object of the invention to provide a quantity measuring coffee machine that will measure a desired quantity of coffee and then brew the measured coffee.

It is a further object of the invention to indicate to a user when the supply of coffee is nearly depleted, prompting the user to add more coffee to the machine.

It is a still further object to produce a coffee machine that efficiently fits in a corner space.

The invention is a coffee machine, for measuring and dispensing a desired quantity of coffee material, comprising a coffee bin, for holding coffee material, the coffee bin having a bin nozzle. A measuring disk is mounted below the bin nozzle, the measuring disk having a plurality of measuring cavities and each measuring cavity corresponding to a quantity of coffee material. A selector knob allows a user to align a specific measuring cavity directly below the bin nozzle. An upper solenoid selectively allows and prevents the flow of coffee material from the bin nozzle to the measuring cavity directly below the bin nozzle. A lower solenoid selectively allows the flow of coffee material from the measuring cavity directly below the bin nozzle, and prevents coffee material flow from that measuring cavity to allow it to fill with coffee material.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described below.

FIG. 1 is a diagrammatic perspective view of a first embodiment of the instant invention.

FIG. 2 is a front elevational view taken in the direction of arrow 2 in FIG. 1.

FIG. 2a is a diagrammatic view with parts broken away, taken in the direction of arrow 2a in FIG. 1.

FIG. 3 is a top plan view, taken in the direction of arrow 3 in FIG. 1.

FIG. 4 is a diagrammatic perspective view of a second embodiment of the instant invention.

FIG. 5 is a side elevational view, with parts broken away, taken in the direction of arrow 5 in FIG. 4.

FIG. 6 is a diagrammatic perspective view, illustrating the mechanism for controlling the flow of coffee material.

DETAILED DESCRIPTION OF THE PREFERRED EMBODIMENTS

FIG. 1 illustrates a first embodiment of a coffee machine 10. The coffee machine has a housing 11. The housing has a bin 12, that is filled with coffee material 14 through a bin filling hatch 16.

Coffee material 14 exits the bin 12 through a coffee bin nozzle 18. Coffee material drops from the bin nozzle 18 through a measuring cavity 26 in a measuring disk 20. Coffee material exiting the measuring disk 20 enters a dispensing nozzle 22, where it is dispensed directly into a vessel 24, if the machine is designed for instant coffee. The dispensing nozzle 22 is positioned directly below the bin nozzle 18.

If the machine is designed for brew coffee then a filter basket 66 must be first inserted in the vessel.

The coffee machine 10 has an upper solenoid 28, selectively controlling the flow of coffee material from the bin nozzle 18 to the measuring disk 20. The coffee machine also has a lower solenoid 30, selectively controlling the flow of coffee material from the measuring disk 20 to the dispensing nozzle 22.

Referring to FIG. 2a, the measuring disk 20 has a circumference 23. Several measuring cavities 26 are arranged around the circumference 23 of the measuring disk 20. The measuring cavities 26 are substantially round, having differing diameters, corresponding to various servings that a user can select. The measuring cavities 26 are bored through the disk.

The measuring cavities 26 are spaced around the circumference so that the distance across the diameter of each measuring cavity 26 plus the space to the adjacent measuring cavity 26 is at least the diameter of the largest of the measuring cavities 26.

The measuring disk 20 has a toothed track 27 around its circumference.

Referring to FIG. 6, the upper solenoid 28 has an upper solenoid plate 32. The upper solenoid plate 32 is slidable to selectively: retract to a position where it allows coffee material to flow from the bin nozzle 18 into the measuring cavity 26 directly below the bin nozzle 18; and extend to a position where it covers one of the measuring cavities directly below the bin nozzle to prevent the flow of coffee material from the bin nozzle.

The bin nozzle 18 should be mounted above the measuring disk 20 as close as tolerances allow. Between the bin nozzle 18 and measuring disk 20, sufficient space should be provided to allow the upper solenoid plate 32 to be extended and retracted with only minimal interference. However, the distance between the bin nozzle 18 and measuring disk 18 should be approximately the size of particles of coffee material 14, to prevent coffee material from escaping the measuring cavity 26 while it is being filled.

The lower solenoid 30 has a lower solenoid plate 34. The lower solenoid plate 34 is slidable to selectively: retract to a position where it allows coffee material to flow from the measuring cavity 26 directly below the bin nozzle; and extend to a position where it prevents the flow of coffee material from the measuring cavity 26 directly below the bin nozzle, to allow that measuring cavity to fill with coffee material.

Referring to FIG. 2, a selector knob 36 is used to choose the desired quantity of coffee to be dispensed by rotating the measuring disk 20. Referring back to FIG. 1, the selector knob 36 has a geared shaft 38 that meshes with the toothed track 27 around the circumference of the measuring disk 20 to rotate the measuring disk, to align one of the measuring cavities 26 with the bin nozzle that corresponds to the desired quantity of coffee material to be dispensed.

Referring back to FIG. 1, a coffee material sensor 40 is located in the bin 12 near the bin nozzle 18. The coffee material sensor 40 enables an indicator light 42, shown in FIG. 2, when there is an absence of coffee material near the coffee material sensor 40. The coffee material sensor 40 can be a ordinary switch, which would be normally open when pressure is exerted against it from the presence of coffee in the bin 14 near the coffee material sensor 40.

FIG. 3 is a top plan view, illustrating the housing 11. The housing has a front face 44 upon which the selector knob 36 is mounted, and a back face 46 opposite the front face 44. The back face has a right angled portion 48 that is directly opposite the front face 44, so that the back face may be positioned in a wall corner 50 with the front face opposite the wall corner 50.

FIG. 4 illustrates a second embodiment of the coffee machine 10, enclosed in which the housing is round 11. In this embodiment, the selector knob is a thumb wheel 52 mounted around the circumference 23 of the measuring disk 20, wherein the user directly turns the measuring disk 20.

In the second embodiment, the coffee machine 10 has a coffee brewing apparatus, for brewing the coffee material 14 measured. Instead of falling directly into the vessel 24 through a dispensing nozzle 22, in the second embodiment the coffee material 14 falls from the measuring disk 20 into a filter 54. A filter panel 55 in the front surface 44 (FIG. 4) provides access to the filter 54. A measured quantity of water is applied to coffee material 14 in the filter by a water reservoir 56.

The water supply has a measuring valve system 58, for regulating the flow of water from the water reservoir 56. The water reservoir 56 also has a hot water fill port 60, for replenishing hot water to the water reservoir 56. Brewed coffee falls through the filter into a coffee pot 62.

A compartment 64 for storing filters is mounted on an outer surface of the housing 11.

What is claimed is:

1. A coffee machine, for measuring and dispensing a quantity of coffee selected by a user, comprising:
    a) a bin, for holding coffee material, the bin having a bin nozzle;
    b) a dispensing disk, having a plurality of dispensing measuring cavities, the dispensing cavities varying in size from each other and extending through the dispensing disk;
    c) a selector knob, mechanically connected to the dispensing disk, the selector knob moving the measuring disk to align one of the measuring cavities with the bin nozzle that corresponds to the desired quantity of coffee material to be dispensed;
    d) an upper solenoid, having an upper solenoid plate mounted beneath the bin nozzle, the upper solenoid plate is slidable to selectively:
        i) retract to a position where it allows coffee material to flow from the bin nozzle into the measuring cavity directly below the bin nozzle, and
        ii) extend to a position where it covers one of the measuring cavities directly below the bin nozzle to prevent the flow of coffee material from the bin nozzle; and
    e) a lower solenoid, having a lower solenoid plate mounted beneath the bin nozzle, the lower solenoid plate is slidable to selectively:
        i) retract to a position where it allows coffee material to flow from the measuring cavity directly below the bin nozzle, and
        ii) extend to a position where it prevents the flow of coffee material from the measuring cavity directly below the bin nozzle, to allow that measuring cavity to fill with coffee material.

2. The apparatus as recited in claim 1, further comprising dispensing nozzle, for dispensing coffee material into a vessel, the dispensing nozzle positioned directly beneath the bin nozzle.

3. The apparatus as recited in claim 2, further comprising a coffee brewing means, mounted beneath the dispensing nozzle, for brewing coffee material exiting the dispensing nozzle.

4. The apparatus as recited in claim 3, wherein the apparatus is further comprised within a housing, the housing having a front face upon which the selector knob is mounted, and a back face, having a right angle directly opposite the front face, so that the back face may be mounted in a corner with the front face opposite the corner.

5. The apparatus as recited in claim 4, further comprising an indicator light, and a coffee material sensor mounted in the bin near the dispensing nozzle for enabling the indicator light upon the absence of coffee material near the coffee material sensor.

6. The apparatus as recited in claim 5, wherein the selector knob is a thumb wheel, allowing the user to directly turn the measuring disk.

* * * * *